United States Patent
Sawayama

(10) Patent No.: US 10,461,285 B2
(45) Date of Patent: *Oct. 29, 2019

(54) NONAQUEOUS ELECTROLYTE SECONDARY BATTERY

(71) Applicant: Seiko Instruments Inc., Chiba-shi, Chiba (JP)

(72) Inventor: Takumi Sawayama, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 785 days.

This patent is subject to a terminal disclaimer.

(21) Appl. No.: 15/018,217

(22) Filed: Feb. 8, 2016

(65) Prior Publication Data

US 2016/0268559 A1 Sep. 15, 2016

(30) Foreign Application Priority Data

Mar. 12, 2015 (JP) ................................. 2015-049562

(51) Int. Cl.
*H01M 2/02* (2006.01)
*H01M 2/04* (2006.01)
(Continued)

(52) U.S. Cl.
CPC ........... *H01M 2/08* (2013.01); *H01M 2/0222* (2013.01); *H01M 2/1613* (2013.01);
(Continued)

(58) Field of Classification Search
CPC .... H01M 2/02; H01M 2/0222; H01M 2/1613; H01M 4/485; H01M 4/505; H01M 10/427; H01M 10/0525; H01M 10/0585
(Continued)

(56) References Cited

U.S. PATENT DOCUMENTS

| 5,348,818 A | * | 9/1994 | Asami | ...................... D01F 9/28 |
|---|---|---|---|---|
| | | | | 423/445 R |
| 2008/0096110 A1 | * | 4/2008 | Bito | ...................... H01M 4/131 |
| | | | | 429/220 |
| 2008/0166631 A1 | * | 7/2008 | Takahashi | ............... H01M 2/08 |
| | | | | 429/185 |

FOREIGN PATENT DOCUMENTS

| EP | 2 897 188 A1 | 7/2015 |
|---|---|---|
| JP | 58-135569 A | 8/1983 |

(Continued)

OTHER PUBLICATIONS

English Machine Translation of Sakamoto et al JP 2008-0178158 (Year: 2008).*

(Continued)

*Primary Examiner* — Eli S Mekhlin
*Assistant Examiner* — Kourtney R S Carlson
(74) *Attorney, Agent, or Firm* — Brinks Gilson & Lione

(57) ABSTRACT

Provided is a nonaqueous electrolyte secondary battery including a bottomed cylindrical positive electrode casing, and a negative electrode casing which is fixed to an opening of the positive electrode casing through a gasket. The opening of the positive electrode casing is caulked to the negative electrode casing side to seal an accommodation space. A caulking tip end in the opening of the positive electrode casing is disposed in an inward direction of the negative electrode casing than a tip end of the negative electrode casing. A diameter d of the nonaqueous electrolyte secondary battery is in a range of 6.6 mm to 7.0 mm, a height h1 of the nonaqueous electrolyte secondary battery is in a range of 1.9 mm to 2.3 mm, a side surface portion of the positive electrode casing is formed in a curved surface shape, a radius of curvature R is set in a range of 0.8 mm to 1.1 mm, and a height h2 of the positive electrode casing is (Continued)

in a range of 65% to 73% with respect to the height h1 of the nonaqueous electrolyte secondary battery.

10 Claims, 6 Drawing Sheets

(51) Int. Cl.
| | |
|---|---|
| H01M 2/08 | (2006.01) |
| H01M 2/16 | (2006.01) |
| H01M 4/485 | (2010.01) |
| H01M 4/505 | (2010.01) |
| H01M 10/0568 | (2010.01) |
| H01M 10/0569 | (2010.01) |
| H01M 10/0525 | (2010.01) |
| H01M 4/02 | (2006.01) |

(52) U.S. Cl.
CPC ........... *H01M 4/485* (2013.01); *H01M 4/505* (2013.01); *H01M 10/0525* (2013.01); *H01M 10/0568* (2013.01); *H01M 10/0569* (2013.01); *H01M 2004/027* (2013.01); *H01M 2004/028* (2013.01); *H01M 2220/30* (2013.01)

(58) Field of Classification Search
USPC ........................................................ 429/174
See application file for complete search history.

(56) References Cited

FOREIGN PATENT DOCUMENTS

| | | |
|---|---|---|
| JP | 09-283102 A | 10/1997 |
| JP | 2000-243449 A | 9/2000 |
| JP | 2008-078158 A | 4/2008 |
| JP | 2011216479 A * | 10/2011 |

OTHER PUBLICATIONS

English Machine Translation of Hattori et al JP 2011-216479 (Year: 2011).*
"V6HR Cell Varta", Sep. 5, 2003, Retrieved from the Internet: http://www.farnell.com/cad/423089.pdf, on Jun. 23, 2016, one page.
Extended European Search Report in corresponding European Application No. 16158808.2, dated Jul. 7, 2016, 7 pages.

* cited by examiner

NONAQUEOUS ELECTROLYTE SECONDARY BATTERY

RELATED APPLICATIONS

This application claims priority under 35 U.S.C. § 119 to Japanese Patent Application No. 2015-049562 filed on Mar. 12, 2015, the entire content of which is hereby incorporated by reference.

BACKGROUND OF THE INVENTION

Field of the Invention

The present invention relates to a nonaqueous electrolyte secondary battery.

Background Art

The nonaqueous electrolyte secondary battery has been used in a power supply unit of an electronic apparatus, an electric power storage unit that absorbs a variation in electric power generation of a power generator, and the like. Particularly, a small-sized nonaqueous electrolyte secondary battery such as a coin-type (button-type) battery, has been widely employed in portable devices as a power supply for motor driving and the like, in addition to a backup power supply as a timepiece function, a backup power supply of a semiconductor memory, an auxiliary power supply of an electronic device such as a microcomputer and an IC memory, and a battery of a solar timepiece (for example, refer to JP-A-2000-243449). The coin-type nonaqueous electrolyte secondary battery employs, for example, a structure in which a positive electrode, a negative electrode, and an electrolyte are accommodated in an accommodation space surrounded by a bottomed cylindrical positive electrode casing and a negative electrode casing, and the positive electrode is electrically connected to the positive electrode casing, and the negative electrode is electrically connected to the negative electrode casing. In addition, a gasket is interposed between the positive electrode casing and the negative electrode casing, and the space between the positive electrode casing and the negative electrode casing are caulked to seal the accommodation space of the nonaqueous electrolyte secondary battery.

In addition, recently, application of the coin-type nonaqueous electrolyte secondary battery, for example, to a power supply of an electric vehicle, an auxiliary electric power storage unit of an energy converting and storage system, and the like has been examined. Particularly, in a case where a lithium manganese oxide is used as a positive electrode active material, and a silicon oxide ($SiO_X$) is used as a negative electrode active material, it is possible to obtain a nonaqueous electrolyte secondary battery in which charging and discharging characteristics are excellent with a high energy density, and a cycle lifetime is long.

Here, in a case where a non-reflow type nonaqueous electrolyte secondary battery of the related art is used for backup of a memory of a portable phone or a digital camera, an operation guarantee temperature range is −20° C. to 60° C. On the other hand, recently, realization of a nonaqueous electrolyte secondary battery, which can be used for an electronic component of an in-vehicle component such as a drive recorder under a high-temperature environment of 80° C. or higher, has been expected. However, when the nonaqueous electrolyte secondary battery is used under the high-temperature environment, an electrolytic solution inside the battery volatilizes, and lithium deteriorates due to intrusion of moisture into the battery, and thus there is a problem in that capacity greatly deteriorates.

To suppress the volatilization of the electrolytic solution from the inside of the nonaqueous electrolyte secondary battery under the high-temperature environment or the intrusion of moisture into the inside of the battery as described above, there is suggested a technology of setting a region, in which a compression ratio of the gasket interposed between the positive electrode casing and the negative electrode casing is in a predetermined range, at two or more sites around the entire periphery of the gasket (for example, refer to JP-A-58-135569).

In addition, with regard to the nonaqueous electrolyte secondary battery, there is suggested a technology in which the compression ratio of the gasket interposed between the positive electrode casing and the negative electrode casing is set to a predetermined range at three-point positions between a tip end of the positive electrode casing and the negative electrode casing, between a tip end of the negative electrode casing and the positive electrode casing, and between a folded tip end of the negative electrode casing and the positive electrode casing, and the magnitudes of compression ratios at the respective three-point positions are set in this order (for example, refer to JP-A-9-283102).

JP-A-58-135569 and JP-A-9-283102 disclose that when the compression ratio of the gasket interposed between the positive electrode casing and the negative electrode casing is set to a predetermined range, the following effects can be expected. Specifically, sealing properties of the nonaqueous electrolyte secondary battery can be raised, leakage of an electrolytic solution can be suppressed, and intrusion of moisture can be suppressed.

SUMMARY OF THE INVENTION

However, when only the compression ratio of the gasket is defined as described in JP-A-58-135569 and JP-A-9-283102, in a case where the nonaqueous electrolyte secondary battery is used or stored under a high-temperature environment, a gap occurs between the positive electrode casing or the negative electrode casing and the gasket as illustrated in a schematic cross-sectional view of FIG. 6, and thus it is still difficult to effectively prevent volatilization of the electrolytic solution and intrusion of moisture into the inside of the battery.

On the other hand, for example, the following configuration may be considered. Specifically a gap between the positive electrode casing and the negative electrode casing may be set to be narrower to increase the compression ratio of the gasket so as to further raise the sealing properties of the battery. However, when the compression ratio of the gasket is set to be too high, there is a concern that the gasket may be fractured, particularly, under a high-temperature environment. Accordingly, there is a problem in that the sealing properties of the battery deteriorate due to fracturing of the gasket. That is, it is difficult to improve the sealing properties of the battery during use or storage under a high-temperature environment by simply increasing the compression ratio of the gasket interposed between the positive electrode casing and the negative electrode casing. Accordingly, it can be said that any technology capable of effectively preventing volatilization of the electrolytic solution, intrusion of moisture into the inside of the battery, and the like is not disclosed.

The invention has been made in consideration of the above-described problems, and an object thereof is to provide a nonaqueous electrolyte secondary battery in which occurrence of a gap between a positive electrode casing or a negative electrode casing and a gasket is suppressed to improve sealing properties of the battery, and thus volatilization of an electrolytic solution or intrusion of moisture into the inside of the battery can be effectively prevented, battery characteristics do not deteriorate and sufficient discharging capacity can be retained under a high-temperature environment, the discharging capacity is large, and excellent storage characteristics are provided.

To solve the above-described problems, the present inventors have made a thorough experimental investigation. As a result, they have obtained the following finding. Specifically, when defining a position of a caulking tip end in an opening of the positive electrode casing that constitutes the secondary battery, a shape and dimensions of a side surface portion of the positive electrode casing, and a size relationship between the nonaqueous electrolyte secondary battery and the positive electrode casing instead of defining a compression ratio of a gasket interposed between the positive electrode casing and the negative electrode casing similar to the related art, the compression ratio of the gasket interposed between the positive electrode casing and the negative electrode casing also become appropriate, and thus sealing properties can be effectively improved. According to this, the present inventors have found that volatilization of an electrolytic solution or intrusion of moisture into the inside of the battery can be prevented, and high battery characteristics can be retained even under a high-temperature environment, and they have accomplished the invention.

That is, according to an aspect of the invention, there is provided a nonaqueous electrolyte secondary battery including a bottomed cylindrical positive electrode casing, and a negative electrode casing which is fixed to an opening of the positive electrode casing through a gasket, and forms an accommodation space between the positive electrode casing and the negative electrode casing. The opening of the positive electrode casing is caulked to the negative electrode casing side to seal the accommodation space. The caulking is performed in such a manner that a caulking tip end in the opening of the positive electrode casing is disposed in an inward direction of the negative electrode casing than a tip end of the negative electrode casing. A diameter d of the nonaqueous electrolyte secondary battery is in a range of 6.6 mm to 7.0 mm, a height h1 of the nonaqueous electrolyte secondary battery is in a range of 1.9 mm to 2.3 mm, at least a part of a side surface portion of the positive electrode casing on an opening side is formed in a curved surface shape, a radius of curvature R of the curved surface is set in a range of 0.8 mm to 1.1 mm, and a height h2 of the positive electrode casing is in a range of 65% to 73% with respect to the height h1 of the nonaqueous electrolyte secondary battery.

According to the invention, in the nonaqueous electrolyte secondary battery having the above-described size, when the caulking tip end in the opening of the positive electrode casing is disposed in an inward direction of the negative electrode casing than the tip end of the negative electrode casing, and the size of the nonaqueous electrolyte secondary battery, the radius of curvature R of the side surface portion of the positive electrode casing, and a size relationship between the nonaqueous electrolyte secondary battery and the positive electrode casing are respectively set in the above-described ranges, it is possible to reliably press the negative electrode casing by the positive electrode casing, and it is possible to compress the gasket at a sufficient compression ratio, and thus sealing conditions are defined in an appropriate range. According to this, even when the nonaqueous electrolyte secondary battery is used or stored under a high-temperature environment, occurrence of a gap between the positive electrode casing or the negative electrode casing and the gasket is suppressed, and sealing properties of the battery can be improved. Accordingly, it is possible to prevent volatilization of an electrolytic solution and intrusion of moisture in the air to the inside of the battery, and thus it is possible to realize a nonaqueous electrolyte secondary battery excellent in storage characteristics.

In addition, in the nonaqueous electrolyte secondary battery configured as described above, the gasket may be formed from any one of a polypropylene resin, polyphenylene sulfide (PPS), and a polyether ether ketone (PEEK) resin.

When the gasket is configured by any one of the above-described resin materials, it is possible to prevent the gasket from being significantly deformed during use or storage under a high-temperature environment, and sealing properties of the nonaqueous electrolyte secondary battery are further improved.

In addition, in the nonaqueous electrolyte secondary battery configured as described above, a configuration in which a positive electrode which is provided on the positive electrode casing side and includes a lithium compound as a positive electrode active material, a negative electrode which is provided on the negative electrode casing side and includes $SiO_X$ ($0 \leq X < 2$) as a negative electrode active material, a separator which is disposed between the positive electrode and the negative electrode, and an electrolytic solution which fills the accommodation space and includes at least an organic solvent and a supporting salt is accommodated in the accommodation space may be employed.

When employing a configuration including a lithium compound as the positive electrode active material and $SiO_X$ ($0 \leq X < 2$) or a lithium compound as a negative electrode active material similar to the above-described configuration, it is possible to realize a nonaqueous electrolyte secondary battery which is capable of obtaining higher discharging capacity even in the case of being used or stored under a high-temperature environment.

In the nonaqueous electrolyte secondary battery configured as described above, the positive electrode active material preferably includes a lithium manganese oxide or a lithium titanate.

When using the above-described compound as the positive electrode active material, even in the case of being used or stored under a high-temperature environment, it is possible to realize a nonaqueous electrolyte secondary battery in which a reaction between the electrolytic solution and the electrodes is suppressed in a charging and discharging cycle, and thus a decrease in capacity can be prevented and higher discharging capacity can be obtained.

In addition, in the nonaqueous electrolyte secondary battery configured as described above, a configuration in which capacity balance (negative electrode capacity (mAh)/positive electrode capacity (mAh)), which is expressed by capacity of the negative electrode and capacity of the positive electrode, is in a range of 1.43 to 2.51 may be employed.

When the capacity balance between the positive electrode and the negative electrode is set to the above-described range, and a predetermined margin is secured for the capacity on a negative electrode side, even when decomposition due to a battery reaction quickly progresses, it is possible to secure a negative electrode capacity of a certain value or more. According to this, even when the nonaqueous electrolyte secondary battery is stored or used for a long period of time under a strict high-temperature and high-humidity environment, a decrease in discharging capacity does not occur, and storage characteristics are improved.

In addition, in the nonaqueous electrolyte secondary battery configured as described above, a configuration in which the negative electrode active material may include lithium (Li) and $SiO_X$ ($0 \leq X < 2$), and a molar ratio ($Li/SiO_X$) between lithium and $SiO_X$ is in a range of 3.9 to 4.9 may be employed.

When the negative electrode active material is configured by lithium (Li) and $SiO_X$, and a molar ratio thereof is set to the above-described range, it is possible to prevent charging abnormality and the like, and even in the case of being used or stored for a long period of time under a high-temperature environment, a decrease in discharging capacity does not occur, and storage characteristics are improved.

In addition, in the nonaqueous electrolyte secondary battery configured as described above, in the electrolytic solution, the organic solvent is preferably a mixed solvent which contains propylene carbonate (PC) that is a cyclic carbonate solvent, ethylene carbonate (EC) that is a cyclic carbonate solvent, and dimethoxy ethane (DME) that is a chain ether solvent.

When the organic solvent that is used in the electrolytic solution is set to the mixed solvent of respective compositions similar to the above-described configuration, it is possible to retain sufficient discharging capacity in a broad temperature range also including a high-temperature environment.

Specifically, first, when using PC and EC which have a high dielectric constant and high solubility for the supporting salt as the cyclic carbonate solvent, it is possible to obtain large discharging capacity. In addition, it is possible to obtain an electrolytic solution that is less likely to volatilize even in the case of being used or stored under a high-temperature environment when considering that PC and EC have a high boiling point.

In addition, when PC, which has a melting point lower than that of EC, and EC are mixed and used as the cyclic carbonate solvent, it is possible to improve low-temperature characteristics.

In addition, when DME having a low melting point is used as the chain ether solvent, low-temperature characteristics are improved. In addition, DME has low viscosity, and thus electrical conductivity of the electrolytic solution is improved. In addition, DME solvates with Li ions, and thus it is possible to obtain large discharging capacity as the nonaqueous electrolyte secondary battery.

In addition, in the nonaqueous electrolyte secondary battery configured as described above, in the organic solvent, a mixing ratio between the propylene carbonate (PC), the ethylene carbonate (EC), and the dimethoxy ethane (DME) is more preferably (PC:EC:DME)=0.5 to 1.5:0.5 to 1.5:1 to 3 in terms of a volume ratio.

When a mixing ratio of the organic solvent that is used in the electrolytic solution is defined in an appropriate range similar to the above-described configuration, it is possible to attain a significant effect of improving low-temperature characteristics without deteriorating the above-described capacity retention under a high-temperature.

In addition, in the nonaqueous electrolyte secondary battery configured as described above, in the electrolytic solution, the supporting salt is preferably lithium bis(trifluoromethane) sulfonimide ($Li(CF_3SO_2)_2N$).

When the supporting salt that is used in the electrolytic solution is set to the above-described lithium compound, it is possible to obtain sufficient discharging capacity in a broad temperature range also including a high-temperature environment, and characteristics of the nonaqueous electrolyte secondary battery are improved.

In addition, in the nonaqueous electrolyte secondary battery configured as described above, a configuration in which the separator is formed from glass fiber may be employed.

When the separator is configured by the glass fiber, internal resistance of the nonaqueous electrolyte secondary battery is reduced and discharging capacity is further improved when considering that a separator having excellent mechanical strength and large ion permeability can be obtained.

According to the nonaqueous electrolyte secondary battery of the invention, as described above, when the caulking tip end in the opening of the positive electrode casing is disposed in an inward direction than the tip end of the negative electrode casing, and the size of the nonaqueous electrolyte secondary battery, the radius of curvature R of the side surface portion of the positive electrode casing, and a size relationship between the nonaqueous electrolyte secondary battery and the positive electrode casing are respectively set in the above-described ranges, it is possible to reliably press the negative electrode casing by the positive electrode casing, and it is possible to compress the gasket at a sufficient compression ratio, and thus sealing conditions are defined in an appropriate range.

According to this, even when the nonaqueous electrolyte secondary battery having a size in which the diameter d is in a range of 6.6 mm to 7.0 mm, and a height h1 is in a range of 1.9 mm to 2.3 mm is used or stored under a high-temperature environment, occurrence of a gap between the positive electrode casing or the negative electrode casing and the gasket is suppressed, and thus sealing properties of the battery can be improved. As a result, volatilization of an electrolytic solution or intrusion of moisture in the air to the inside of the battery can be effectively prevented.

Accordingly, it is possible to provide a nonaqueous electrolyte secondary battery in which even under a high-temperature environment, battery characteristics do not deteriorate, sufficient discharging capacity can be retained, discharging capacity is large, and excellent storage characteristics are provided.

DETAILED DESCRIPTION OF THE INVENTION

Hereinafter, a configuration of a nonaqueous electrolyte secondary battery according to an embodiment of the invention will be described in detail as an example with reference to FIGS. 1 and 2. In addition, specifically, the nonaqueous electrolyte secondary battery described in the invention is a nonaqueous electrolyte secondary battery in which an active material used as a positive electrode or a negative electrode, and an electrolytic solution are accommodated in a container.

Nonaqueous Electrolyte Secondary Battery

Figure 1:
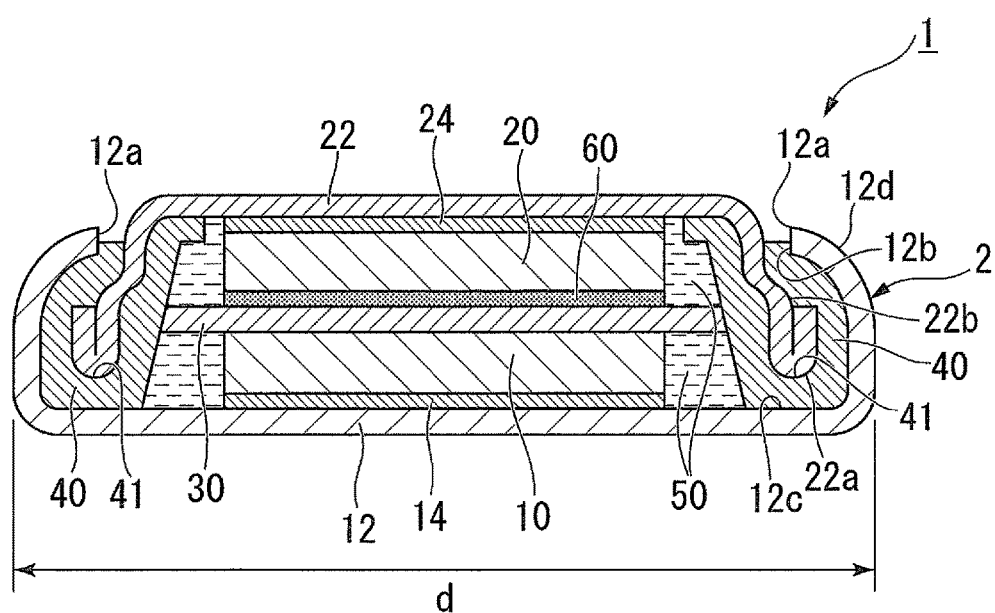
FIG. 1 is a schematic cross-sectional view illustrating a nonaqueous electrolyte secondary battery according to an embodiment of the invention.
Figure 2:
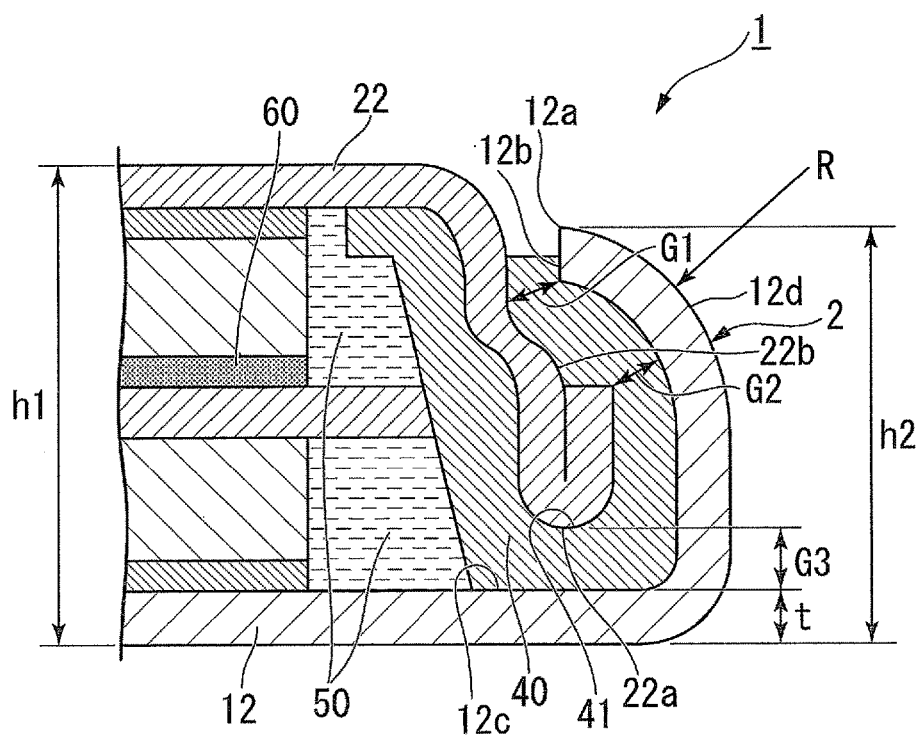
FIG. 2 is a schematic cross-sectional view illustrating the nonaqueous electrolyte secondary battery according to the embodiment of the invention, and illustrates an enlarged view of main portions illustrated in FIG. 1.

A nonaqueous electrolyte secondary battery 1 according to an embodiment of the invention as illustrated in FIGS. 1 and 2 is a so-called coin-type (button-type) battery. The nonaqueous electrolyte secondary battery 1 includes a positive electrode 10 that is capable of intercalating and deintercalating lithium ions, a negative electrode 20 that is capable of intercalating and deintercalating lithium ions, a that is disposed between the positive electrode 10 and the negative electrode 20, and an electrolytic solution 50 that includes at least a supporting salt and an organic solvent in an accommodation container 2.

More specifically, the nonaqueous electrolyte secondary battery 1 includes an accommodation container 2. The accommodation container 2 includes a bottomed cylindrical positive electrode casing 12, and a covered cylindrical (hat-shaped) negative electrode casing 22 which is fixed to an opening 12a of the positive electrode casing 12 through a gasket 40 and forms an accommodation space between the positive electrode casing 12 and the negative electrode casing 22. The accommodation space is sealed by caulking the peripheral edge of the opening 12a of the positive electrode casing 12 to an inner side, that is, to the negative electrode casing 22 side.

In the accommodation space sealed by the accommodation container 2, the positive electrode 10 that is provided on the positive electrode casing 12 side, and the negative electrode 20 that is provided on the negative electrode casing 22 side are disposed to face each other through the separator 30. In addition, the electrolytic solution 50 fills the accommodation container 2. In addition, in an example illustrated in FIG. 1, lithium foil 60 is interposed between the negative electrode 20 and the separator 30.

In addition, as illustrated in FIG. 1, the gasket 40 is inserted along an inner peripheral surface of the positive electrode casing 12, and is connected to the outer periphery of the separator 30 to support the separator 30.

In addition, the positive electrode 10, the negative electrode 20, and the separator 30 are impregnated with the electrolytic solution 50 that fills the accommodation container 2.

In the nonaqueous electrolyte secondary battery 1 of the example illustrated in FIG. 1, the positive electrode 10 is electrically connected to an inner surface of the positive electrode casing 12 through a positive electrode current collector 14, and the negative electrode 20 is electrically connected to an inner surface of the negative electrode casing 22 through a negative electrode current collector 24. In this embodiment, the nonaqueous electrolyte secondary battery 1, which includes the positive electrode current collector 14 and the negative electrode current collector 24, illustrated in FIG. 1 is described as an example. However, there is no limitation thereto, and for example, a configuration, in which the positive electrode casing 12 also serves as a positive electrode current collector and the negative electrode casing 22 also serves as the negative electrode current collector, may be employed.

The nonaqueous electrolyte secondary battery 1 of this embodiment is schematically configured as described above, and lithium ions migrate from one side of the positive electrode 10 and the negative electrode 20 to the other side thereof, and thus electric charges can be stored (charged) or emitted (discharged).

Positive Electrode Casing and Negative Electrode Casing

In this embodiment, the positive electrode casing 12 that constitutes the accommodation container 2 is configured in a bottomed cylindrical shape as described above, and has the opening 12a having a circular shape when viewed in a plan view. As a material of the positive electrode casing 12, a material, which is known in the related art, may be used without any limitation, and examples thereof include stainless steel such as NAS64.

In addition, the negative electrode casing 22 is configured in a covered cylindrical shape (hat shape) as described above, and has a configuration that a tip end 22a thereof is inserted into the positive electrode casing 12 from the opening 12a. Examples of a material of the negative electrode casing 22 include stainless steel, which is known in the related art, similar to the material of the positive electrode casing 12, and for example, SUS304-BA and the like may be used. In addition, for example, a clad material, which is obtained by pressure-welding copper, nickel, or the like to the stainless steel, may be also used as the negative electrode casing 22.

As illustrated in FIG. 1, in a state in which the gasket 40 is interposed between the positive electrode casing 12 and the negative electrode casing 22, the peripheral edge of the opening 12a of the positive electrode casing 12 is caulked to the negative electrode casing 22 side and is fixed thereto, and thus the nonaqueous electrolyte secondary battery 1 is sealed and is retained in a state in which the accommodation space is formed. Accordingly, the maximum inner diameter of the positive electrode casing 12 is set to a dimension larger than the maximum outer diameter of the negative electrode casing 22.

In addition, in the nonaqueous electrolyte secondary battery 1 of this embodiment, a sealing shape between the positive electrode casing 12 and the negative electrode casing 22, which are fixed to each to each other through the gasket 40 as illustrated in FIG. 2, is configured by adjusting a dispositional relationship and a dimensional relationship between the nonaqueous electrolyte secondary battery 1, the positive electrode casing 12 and the negative electrode casing 22. Specifically, the sealing shape is configured to satisfy the following dispositional relationships and dimensional relationships of (1) to (3).

(1) A caulking tip end 12b in the opening 12a of the positive electrode casing 12 is disposed in an inward direction of the negative electrode casing 22 than the tip end 22a of the negative electrode casing 22.

(2) A diameter d of the nonaqueous electrolyte secondary battery 1 is in a range of 6.6 mm to 7.0 mm, and a height h1 thereof is in a range of 1.9 mm to 2.3 mm.

(3) At least a part of a side surface portion 12d of the positive electrode casing 12 on an opening 12a side is formed in a curved surface shape, a radius of curvature R of the curved surface is set in a range of 0.8 mm to 1.1 mm, and a height h2 of the positive electrode casing 12 is in a range of 65% to 73% with respect to the height h1 of the nonaqueous electrolyte secondary battery 1.

In the nonaqueous electrolyte secondary battery 1 of this embodiment, as illustrated in FIG. 2, the caulking tip end 12b in the opening 12a of the positive electrode casing 12 is disposed in an inward direction of the negative electrode casing 22 than the tip end 22a of the negative electrode casing 22, and the size of the nonaqueous electrolyte secondary battery 1, the radius of curvature R of the side surface portion 12d of the positive electrode casing 12, and the size relationship between the nonaqueous electrolyte secondary battery 1 and the positive electrode casing 12 are respectively set in the above-described ranges, and thus disposition and sealing conditions of the gasket 40 are defined in an appropriate range. According to this, occurrence of a gap between the positive electrode casing 12 or the negative electrode casing 22 and the gasket 40 is suppressed even in the case of use or storage for a long period of time under a high-temperature environment, and thus the sealing properties of the nonaqueous electrolyte secondary battery 1 are improved. As a result, volatilization of the electrolytic solution 50 to the outside of the battery, or intrusion of moisture, which is included in the air, into the battery can be reliably prevented, and thus it is possible to obtain the nonaqueous electrolyte secondary battery 1 which has high capacity retention ratio and excellent storage characteristics under a high-temperature environment.

More specifically, as described above in (1), when the opening 12a of the positive electrode casing 12 is caulked and sealed, the caulking tip end 12b of the positive electrode casing 12 is located in an inward direction than a maximum outer diameter portion of the negative electrode casing 22. Accordingly, it is possible to reliably press the negative electrode casing 22 by the positive electrode casing 12, and it is possible to compress the gasket 40 at a sufficient compression ratio.

In addition, when the entire dimensions of the nonaqueous electrolyte secondary battery 1 are defined as described above in (2), and then the radius of curvature R of the side surface portion 12d of the positive electrode casing 12 is set to the above-described range as described above in (3), as described above, the negative electrode casing 22 is reliably pressed by the positive electrode casing 12, and thus it is possible to significantly obtain an effect capable of compressing the gasket 40 at a sufficient compression rate.

Here, when the radius of curvature R of the side surface portion 12d exceeds 1.1 mm, a force with which the positive electrode casing 12 presses the negative electrode casing 22 from an upper side becomes weak, and thus the compression ratio of the gasket 40 decreases at a position of the bottom 12c. In addition, the height h2 of the positive electrode casing 12 tends to vary, and thus a variation in internal resistance increases.

In addition, when the radius of curvature R of the side surface portion 12d is less than 0.8 mm, a force with which the positive electrode casing 12 presses the negative electrode casing 22 from a side direction becomes weak, and thus the compression ratio of the gasket 40 decreases at a position of the side surface portion 22b of the negative electrode casing.

In addition, when the entire dimensions of the nonaqueous electrolyte secondary battery 1 are defined as described above in (2), and then the height h2 of the positive electrode casing 12 is set to the above-described range with respect to the height h1 of the nonaqueous electrolyte secondary battery 1 as described above in (3), as described above, the negative electrode casing 22 is reliably pressed by the positive electrode casing 12, and thus it is possible to further significantly obtain an effect capable of compressing the gasket 40 at a sufficient compression rate.

Here, when the ratio of the height h2 of the positive electrode casing 12 to the height h1 of the nonaqueous electrolyte secondary battery 1 exceeds 73%, in the battery size of this embodiment, a force with which the positive electrode casing 12 presses the negative electrode casing 22 from an upper side becomes weak, and thus there is a concern that the compression ratio of the gasket 40 decreases at a position of the bottom 12c.

In addition, when the ratio of the height h2 of the positive electrode casing 12 to the height h1 of the nonaqueous electrolyte secondary battery 1 is less than 65%, the compression ratio of the gasket 40 becomes excessive and fracturing occurs, and thus there is a possibility that short-circuit between the positive electrode casing 12 and the negative electrode casing 22, and the like may occur.

In addition, in the nonaqueous electrolyte secondary battery 1 of this embodiment, typically, a sheet thickness of a metal sheet material that is used in the positive electrode casing 12 or the negative electrode casing 22 is approximately 0.1 mm to 0.3 mm, and for example, an average sheet thickness t of the positive electrode casing 12 or the negative electrode casing 22 may be set to approximately 0.15 mm.

In addition, in the example illustrated in FIGS. 1 and 2, the tip end 22a of the negative electrode casing 22 has a folded-back shape, but there is no limitation thereto. For example, the invention is also applicable to a shape which does not have a folded-back shape and in which an end surface of a metal sheet material is set as the tip end 22a.

In addition, as described above, the configuration of the invention, in which the sealing conditions are defined by the dispositional relationship and the dimensional relationship between the positive electrode casing 12 and the negative electrode casing 22 of the nonaqueous electrolyte secondary battery 1, is applicable to a coin type (621 size) nonaqueous electrolyte secondary battery in which the diameter d is in a range of 6.6 mm to 7.0 mm, and the height h1 is in a range of 1.9 mm to 2.3 mm.

Here, in the nonaqueous electrolyte secondary battery 1 that is described in this embodiment, particularly, the height h2 of the positive electrode casing 12 is in a range of 65% to 73% with respect to the entire height h1 of the nonaqueous electrolyte secondary battery 1, and thus it is possible to reliably perform holding-down of the negative electrode casing 22 by caulking the positive electrode casing 12 during sealing. That is, in the nonaqueous electrolyte secondary battery 1, a ratio of (the height h2 of the positive electrode casing)/(the height h1 of the nonaqueous electrolyte secondary battery) is set in the defined range, and thus occurrence of a gap between the positive electrode casing 12 or the negative electrode casing 22 and the gasket 40 is suppressed even in the case of use or storage for a long period of time under a high-temperature environment, and thus it is possible to significantly obtain an effect of improving the sealing properties of the nonaqueous electrolyte secondary battery 1.

Gasket

As illustrated in FIG. 1, the gasket 40 is formed in an annular ring shape along the inner peripheral surface of the positive electrode casing 12, and the tip end 22a of the negative electrode casing 22 is disposed inside an annular groove 41 of the gasket 40.

In addition, for example, it is preferable that a material of the gasket 40 be a resin in which a heat deformation temperature is 230° C. or higher. When the heat deformation temperature of the resin material that is used in the gasket 40 is 230° C. or higher, even when the nonaqueous electrolyte secondary battery 1 is used or stored under a high-temperature environment, or even when heat generation occurs during use of the nonaqueous electrolyte secondary battery 1, it is possible to prevent the gasket from being significantly deformed, and thus it is possible to prevent the electrolytic solution 50 from leaking.

Examples of a material of the gasket 40 include plastic resins such as a polypropylene resin (PP), polyphenylene sulfide (PPS), polyethylene terephthalate (PET), polyamide, a liquid crystal polymer (LCP), a tetrafluoroethylene-perfluoroalkyl vinyl ether copolymer resin (PFA), a polyether ether ketone resin (PEEK), a polyether nitrile resin (PEN), a polyether ketone resin (PEK), a polyarylate resin, a polybutylene terephthalate resin (PBT), a polycyclohexane dimethylene terephthalate resin, a polyether sulfone resin (PES), a polyamino bismaleimide resin, a polyether imide resin, and a fluorine resin. Among these, it is preferable to use any one of PP, PPS, and PEEK in the gasket 40 when considering that it is possible to prevent the gasket from being significantly deformed during use or storage under a high-temperature environment, and the sealing properties of the nonaqueous electrolyte secondary battery are further improved.

In addition, in the gasket 40, a material, which is obtained by mixing glass fiber, mica whiskers, ceramic fine powders, and the like to the above-described material in an added amount of 30 mass % or less, may be appropriately used. When using this material, it is possible to prevent significant deformation of the gasket due to a high-temperature and leakage of the electrolytic solution 50.

In addition, a sealing agent may be further applied onto an inner side surface of the annular groove of the gasket 40. As the sealing agent, asphalt, an epoxy resin, a polyamide-based resin, a butyl rubber-based adhesive, and the like may be used. In addition, after being applied onto the inside of the annular groove 41, the sealing agent is dried.

In addition, in the nonaqueous electrolyte secondary battery 1 of this embodiment, it is preferable to adjust the compression ratio of the gasket 40 after the caulking tip end 12b of the positive electrode casing 12 is disposed in an inward direction than the tip end 22a of the negative electrode casing 22, and the size of the nonaqueous electrolyte secondary battery 1, the radius of curvature R of the side surface portion 12d of the positive electrode casing 12, and the size relationship between the nonaqueous electrolyte secondary battery 1 and the positive electrode casing 12 are respectively defined as described above. Specifically, it is preferable that the compression ratio of the gasket 40 at positions of G1 to G3 illustrated in FIG. 2, that is, respective sites to be described below be equal to or more than 50%.

G1: Position with the shortest distance between the caulking tip end 12b of the positive electrode casing 12 and the negative electrode casing 22 in the opening 12a of the positive electrode casing 12.

G2: Position with the shortest distance between the tip end 22a of the negative electrode casing 22 and the positive electrode casing 12.

G3: Position between the tip end 22a of the negative electrode casing 22 and the bottom 12c of the positive electrode casing 12.

In this embodiment, as described above, when the compression ratio of the gasket 40 is adjusted in addition to the definition of the dispositional relationship and the dimensional relationship between the nonaqueous electrolyte secondary battery 1, the positive electrode casing 12, and the negative electrode casing 22, it is possible to more reliably improve the sealing properties of the nonaqueous electrolyte secondary battery, and particularly, in a case of use or storage under a high-temperature environment, it is possible to attain more significant sealing properties.

In addition, the upper limit of the compression ratio of the gasket 40 is not particularly limited, but when the upper limit is set to be equal to or less than 95%, it is possible to retain satisfactory sealing properties without fracture of the gasket 40 under a high-temperature environment.

Electrolytic Solution

In the nonaqueous electrolyte secondary battery 1 of this embodiment, as the electrolytic solution 50, an electrolytic solution including at least an organic solvent and a supporting salt is used. In addition, in the electrolytic solution 50, it is preferable to use a mixed solvent, which contains propylene carbonate (PC) that is a cyclic carbonate solvent, ethylene carbonate (EC) that is a cyclic carbonate solvent, and dimethoxy ethane (DME) that is a chain ether solvent, as the organic solvent.

Typically, the electrolytic solution has a configuration in which the supporting salt is dissolved in a nonaqueous solvent such as an organic solvent, and characteristics of the electrolytic solution are determined in consideration of heat resistance, viscosity, and the like which are demanded for the electrolytic solution.

Generally, in a case of using the electrolytic solution, which uses the organic solvent, in the nonaqueous electrolyte secondary battery, temperature dependency of conductivity increases when considering that solubility of a lithium salt is deficient, and thus there is a problem in that characteristics at a low temperature greatly decrease in comparison to characteristics at room temperature. On the other hand, to improve low-temperature characteristics, for example, in a case of using ethyl methyl carbonate or acetic acid esters which have an asymmetric structure and are chain carbonic acid esters as the organic solvent of the electrolytic solution, there is a problem in that the characteristics of the nonaqueous electrolyte secondary battery at a high temperature conversely decrease. In addition, even in a case of using an organic solvent such as ethyl methyl carbonate in the electrolytic solution, solubility of a lithium salt is also deficient, and there is a limit to improvement of the low-temperature characteristics.

In contrast, in this embodiment, the organic solvent, which is used in the electrolytic solution 50, is set to a mixed solvent that contains PC and EC which are cyclic carbonate solvents, and DME that is a chain ether solvent. Accordingly, it is possible to realize the nonaqueous electrolyte secondary battery 1 which is capable of retaining sufficient discharging capacity in a broad temperature range including the high-temperature environment.

Specifically, first, as the cyclic carbonate solvent, PC and EC which have a high dielectric constant and high solubility for the supporting salt are used, and thus it is possible to obtain large discharging capacity. In addition, it is possible to obtain an electrolytic solution that is less likely to volatilize even in the case of being used or stored under a high-temperature environment when considering that PC and EC have a high boiling point.

In addition, when PC, which has a melting point lower than that of EC, and EC are mixed and used as the cyclic carbonate solvent, it is possible to improve low-temperature characteristics.

In addition, when DME having a low melting point is used as the chain ether solvent, low-temperature characteristics are improved. In addition, DME has low viscosity, and thus electrical conductivity of the electrolytic solution is improved. In addition, DME solvates with Li ions, and thus it is possible to obtain large discharging capacity as the nonaqueous electrolyte secondary battery.

The cyclic carbonate solvent has a structure (Chemical Formula 1) to be described below, and examples thereof include propylene carbonate (PC), ethylene carbonate (EC), butylene carbonate (BC), trifluoroethylene carbonate (TFPC), chloroethylene carbonate (CIEC), trifluoroethylene carbonate (TFEC), difluoroethylene carbonate (DFEC), vinylene carbonate (VEC), and the like. In this embodiment, particularly, from the viewpoint of improvement of capacity retention ratio at a high-temperature in addition to the viewpoints of easiness of film formation on an electrode onto the negative electrode 20 and improvement of low-temperature characteristics, two kinds including PC and EC are used as the cyclic carbonate solvent having the structure (Chemical Formula 1) to be described below.

[Chem. 1]

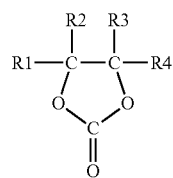

(Chemical Formula 1)

However, in Chemical Formula 1, R1, R2, R3, and R4 represent any one of hydrogen, fluorine, chlorine, an alkyl group having 1 to 3 carbon atoms, and a fluorinated alkyl group. In addition, in Chemical Formula 1, R1, R2, R3, and R4 may be the same as each other or different from each other.

In this embodiment, as described above, when using PC and EC which have a high dielectric constant and high solubility for the supporting salt as the cyclic carbonate solvent, it is possible to obtain large discharging capacity. In addition, it is possible to obtain an electrolytic solution that is less likely to volatilize even in the case of being used or stored under a high-temperature environment when considering that PC and EC have a high boiling point. In addition, when PC, which has a melting point lower than that of EC, and EC are mixed and used as the cyclic carbonate solvent, it is possible to obtain excellent low-temperature characteristics.

The chain ether solvent has a structure expressed by Chemical Formula 2 to be described below, and examples thereof include 1,2-dimethoxy ethane (DME), 1,2-diethoxy ethane (DEE), and the like. In this embodiment, particularly, DME that tends to solvate with lithium ions is used as the chain ether solvent having the structure expressed by Chemical Formula 2 to be described below particularly from the viewpoints of improving the low-temperature characteristics while securing capacity at room temperature in addition to the viewpoint of improving conductivity.

[Chem. 2]

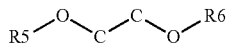

(Chemical Formula 2)

However, in Chemical Formula 2, R5 and R6 represent any one of hydrogen, fluorine, chlorine, an alkyl group having 1 to 3 carbon atoms, and a fluorinated alkyl group. In addition, R5 and R6 may be the same as each other or different from each other.

In this embodiment, as described above, when DME having a low melting point is used as the chain ether solvent, the low-temperature characteristics are improved. In addition, DME has low viscosity, and thus electrical conductivity of the electrolytic solution is improved. In addition, DME solvates with Li ions, and thus it is possible to obtain large discharging capacity as the nonaqueous electrolyte secondary battery.

In the electrolytic solution 50, a mixing ratio of respective solvents in the organic solvent is not particularly limited. However, it is preferable that the mixing ratio be, for example, in a range of (PC:EC:DME)=0.5 to 1.5:0.5 to 1.5:1 to 3 in terms of a volume ratio, more preferably in a range of 0.8 to 1.2:0.8 to 1.2:1.5 to 2.5, and still more preferably (PC:EC:DME)=(1:1:2).

When the mixing ratio of the organic solvent is in the above-described range, it is possible to more significantly obtain the effect of improving the low-temperature characteristics without deteriorating the capacity retention ratio at a high temperature.

Specifically, when a mixing ratio of the propylene carbonate (PC) that is a cyclic carbonate solvent is equal to or more than the lower limit of the range, if PC having a melting point lower than that of EC and EC are mixed and used, it is possible to significantly obtain the effect of improving the low-temperature characteristics.

On the other hand, PC has a dielectric constant lower than that of EC, and thus it is difficult for PC to increase a concentration of the supporting salt. Therefore, when an amount of PC is too large, it may be difficult to obtain large discharging capacity. Accordingly, it is preferable to limit the mixing ratio of PC to a value equal to or less than the upper limit of the range.

In addition, in the organic solvent, when a mixing ratio of the ethylene carbonate (EC) that is a cyclic carbonate solvent is equal to or more than the lower limit of the range, it is possible to increase dielectric constant of the electrolytic solution 50 and solubility for the supporting salt, and it is possible to obtain large discharging capacity as the nonaqueous electrolyte secondary battery.

On the other hand, EC has high viscosity, and thus EC is deficient in electrical conductivity. In addition, EC has a high melting point, and thus when an amount of EC is too large, the low-temperature characteristics may decrease. Accordingly, it is preferable to limit the mixing ratio thereof to a value equal to or less than the upper limit of the range.

In addition, in the organic solvent, when a mixing ratio of dimethoxy ethane (DME) that is a chain ether solvent is set to be equal to or more than the lower limit of the range, a predetermined amount of DME having a low melting point is contained in the organic solvent, and thus it is possible to significantly obtain the effect of improving the low-temperature characteristics. In addition, DME has low viscosity, and thus electrical conductivity is improved. In addition, DME solvates with Li ions, and thus it is possible to obtain large discharging capacity.

On the other hand, DME has a low dielectric constant, and thus it is difficult to increase a concentration of the supporting salt. Accordingly, when an amount of DME is too large, it may be difficult to obtain large discharging capacity, and thus it is preferable to limit the mixing ratio of DME to a value equal to or less than the upper limit of the range.

As the supporting salt that is used in the electrolytic solution 50, a known Li compound, which is added to the electrolytic solution as a supporting salt in the nonaqueous electrolyte secondary battery, may be used, and there is no particular limitation to the supporting salt. Examples of the supporting salt include lithium tetrafluoroborate, lithium bisperfluoromethylsulfonyl imide, lithium bisperfluoroethylsulfonyl imide, lithium bistrifluoromethane sulfonimide ($Li(CF_3SO_2)_2N$), lithium hexafluorophosphate ($LiPF_6$), and the like in consideration of thermal stability and the like. Among these, it is preferable to use $Li(CF_3SO_2)_2N$ or $LiPF_6$ as the supporting salt when considering that it is possible to increase heat resistance of the electrolytic solution and it is possible to suppress a decrease in capacity at a high temperature.

In addition, the supporting salts may be used alone or in combination of two or more kinds thereof.

An amount of the supporting salt in the electrolytic solution 50 may be determined by the kind of the positive electrode active material to be described below and in consideration of the kind of the supporting salt and the like. For example, the amount of the supporting salt is preferably 0.1 mol/L to 3.5 mol/L, more preferably 0.5 mol/L to 3 mol/L, and still more preferably 1 mol/L to 2.5 mol/L. In addition, in a case of using a lithium manganese oxide as the positive electrode active material, the amount of the supporting salt is preferably set to approximately 1 mol/L, and in a case of using lithium titanate, the amount of the supporting salt is preferably set to approximately 1.4 mol/L.

In addition, when the concentration of the supporting salt in the electrolytic solution 50 is too high or too low, conductivity deteriorates, and thus there is a concern that this decrease has an adverse effect on battery characteristics, and thus it is preferable to set the amount of the supporting salt in the above-described range.

In the nonaqueous electrolyte secondary battery 1 of this embodiment, after the caulking tip end 12b of the positive electrode casing 12 is disposed in an inward direction than the tip end 22a of the negative electrode casing 22, and the size of the nonaqueous electrolyte secondary battery 1, the radius of curvature R of the side surface portion 12d of the positive electrode casing 12, and the size relationship between the nonaqueous electrolyte secondary battery 1 and the positive electrode casing 12 are defined as described above, the electrolytic solution 50 having the above-described composition is used. Accordingly, even in a case of use or storage for a long period of time under a high-temperature environment, it is possible to retain high discharging capacity, and retention characteristics become excellent.

In addition, in the nonaqueous electrolyte secondary battery 1 of this embodiment, for example, when using an organic solvent obtained by mixing PC, EC, and DME in the mixing ratios as described above instead of the electrolytic solution 50 having the above-described composition, as the supporting salt, a supporting salt, which contains at least any of lithium bis(fluorosulfonyl) imide (LiFSI) and lithium bis(trifluoromethanesulfonyl) imide (LiTFSI) in a total amount of 0.8 mol/L to 1.2 mol/L, may be employed. When using the electrolytic solution as described above, it is possible to more significantly obtain an effect of improving the low-temperature characteristics without deteriorating the capacity retention ratio at a high temperature or room temperature. In addition, it is more preferable that as the supporting salt, LiFSI having excellent conductivity is used alone, and is contained in the electrolytic solution 50 in an amount of 0.8 mol/L to 1.2 mol/L when considering that it is possible to suppress voltage drop at an initial stage of discharging, it is also possible to improve discharging characteristics under a low-temperature environment, and a sufficient discharging capacity is obtained in a wide temperature range.

Positive Electrode

In positive electrode 10, a kind of a positive electrode active material is not particularly limited, and the positive electrode active material includes a lithium compound. A positive electrode active material that is conventionally known in this field is used, and an active material that is obtained by mixing polyacrylic acid as a binding agent, graphite as a conductive assistant, and the like may be used. Particularly, it is preferable that the positive electrode contain at least one of a lithium manganese oxide ($Li_4Mn_5O_{12}$), lithium titanate ($Li_4Ti_5O_{12}$), $MoO_3$, $LiFePO_4$, and $Nb_2O_3$ as the positive electrode active material. It is more preferable that among these compounds, the positive electrode contain the lithium manganese oxide or the lithium titanate. In addition, with regard to the lithium manganese oxide, for example, a material, which is obtained by adding a transition metal element such as Co and Ni to the lithium manganese oxide expressed as $Li_{1+x}Co_yMn_{2-x-y}O_4$ ($0 \leq x \leq 0.33$, $0 < y \leq 0.2$), may also be used.

When the above-described positive electrode active material is used in the positive electrode 10, particularly, a reaction between the electrolytic solution 50 and the positive electrode 10 at a charging and discharging cycle under a high-temperature environment is suppressed, and thus it is possible to prevent a decrease in capacity, and it is possible to increase capacity retention ratio.

In addition, in this embodiment, not only one kind of the above-described materials but also a plurality of kinds of the above-described materials may be contained as the positive electrode active material.

In addition, in a case of using a granular positive electrode active material configured by the above-described material, a particle size (D50) is not particularly limited, and for example, a particle size of 0.1 μm to 100 μm is preferable, and a particle size of 1 μm to 10 μm is more preferable.

If the particle size (D50) of the positive electrode active material is less than the lower limit of the above-described preferable range, when the nonaqueous electrolyte secondary battery is exposed to a high temperature, reactivity increases, and thus handling becomes difficult. In addition, when the particle size exceeds the upper limit thereof, a discharging rate may decrease.

In addition, the "particle size (D50) of the positive electrode active material" in the invention is a particle size measured by a laser diffraction method and represents a median size.

An amount of the positive electrode active material in the positive electrode 10 is determined in consideration of discharging capacity and the like that are demanded for the nonaqueous electrolyte secondary battery 1, and the amount is preferably 50 mass % to 95 mass %. When the amount of the positive electrode active material is equal to or more than the lower limit of the preferable range, it is easy to obtain sufficient discharging capacity. When the amount of the positive electrode active material is equal to or less than the upper limit of the preferable range, it is easy to form the positive electrode 10.

The positive electrode 10 may contain a conductive assistant (hereinafter, the conductive assistant that is used in the positive electrode 10 may be referred to as a "positive electrode conductive assistant").

Examples of the positive electrode conductive assistant include carbonaceous materials such as furnace black, ketjen black, acetylene black, and graphite.

As the positive electrode conductive assistant, the above-described carbonaceous materials may be used alone or in combination of two or more kinds thereof.

In addition, an amount of the positive electrode conductive assistant in the positive electrode 10 is preferably 4 mass % to 40 mass %, and more preferably 10 mass % to 25 mass %. When the amount of the positive electrode conductive assistant is equal to or more than the lower limit of the preferable range, it is easy to obtain sufficient conductivity. In addition, in a case of molding the electrode in a pellet shape, molding becomes easy. On the other hand, when the amount of the positive electrode conductive assistant in the positive electrode 10 is equal to or less than the upper limit of the preferable range, it is easy to obtain sufficient discharging capacity in the positive electrode 10.

The positive electrode 10 may contain a binder (hereinafter, the binder that is used in the positive electrode 10 may be referred to as a "positive electrode binder").

As the positive electrode binder, a material that is known in the related art may be used, and examples thereof include polytetrafluoroethylene (PTFE), polyvinylidene fluoride (PVDF), styrene-butadiene rubber (SBR), polyacrylic acid (PA), carboxymethyl cellulose (CMC), polyvinyl alcohol (PVA), and the like. Among these, the polyacrylic acid is preferable, and a cross-linking type polyacrylic acid is more preferable.

In addition, as the positive electrode binder, the above-described materials may be used alone or in combination of two or more kinds thereof.

In addition, in a case of using the polyacrylic acid as the positive electrode binder, it is preferable that the polyacrylic acid be adjusted in advance to pH 3 to pH 10. For the pH adjustment in this case, for example, an alkali metal hydroxide such as lithium hydroxide, or an alkali-earth metal hydroxide such as magnesium hydroxide may be used.

An amount of the positive electrode binder in the positive electrode 10 may be set, for example, to 1 mass % to 20 mass %.

The size of the positive electrode 10 is determined in accordance with the size of the nonaqueous electrolyte secondary battery 1.

In addition, the thickness of the positive electrode 10 is also determined in accordance with the size of the nonaqueous electrolyte secondary battery 1. In a case where the nonaqueous electrolyte secondary battery 1 is a coin type for back-up which is dedicated to various electronic apparatuses, for example, the thickness may be approximately 300 μm to 1000 μm.

The positive electrode 10 may be manufactured by a manufacturing method that is known in the related art.

Examples of a method of manufacturing the positive electrode 10 include a method in which the positive electrode active material, and the positive electrode conductive assistant and/or the positive electrode binder, which are added as necessary, are mixed to obtain a positive electrode mixture, and the positive electrode mixture is compression-molded into an arbitrary shape.

A pressure during the compression molding is determined in consideration of a kind of the positive electrode conductive assistant and the like, and for example, may be set to 0.2 ton/cm$^2$ to 5 ton/cm$^2$.

As the positive electrode current collector 14, a material that is known in the related art may be used, and examples thereof include a conductive resin adhesive including carbon as a conductive filler, and the like.

Negative Electrode

In the negative electrode 20, a kind of a negative electrode active material is not particularly limited. A negative electrode active material that is conventionally known in this field is used, and examples thereof include carbon, an alloy-based negative electrode such as Li—Al, a silicon oxide, and the like. In addition, an active material that is obtained by mixing an appropriate binder, polyacrylic acid as a binding agent, graphite as a conductive assistant, and the like may be used. Particularly, it is preferable that the negative electrode active material contain at least one of SiO, SiO$_2$, Si, WO$_2$, WO$_3$, and an Li—Al alloy. When the above-described material is used in the negative electrode 20 as the negative electrode active material, a reaction between the electrolytic solution 50 and the negative electrode 20 at a charging and discharging cycle is suppressed, and thus it is possible to prevent a decrease in capacity, and cycle characteristics are improved.

In addition, in the negative electrode 20, it is more preferable that the negative electrode active material be configured by SiO or SiO$_2$, that is, a silicon oxide expressed by SiO$_X$ (0≤X<2). When the silicon oxide having the above-described composition is used as the negative electrode active material, it is possible to use the nonaqueous electrolyte secondary battery 1 with a high voltage, and the cycle characteristics are improved. In addition, as the negative electrode active material, the negative electrode 20 may contain any one of different negative electrode active materials in addition to SiO$_X$ (0≤X<2).

In a case of using the material as the negative electrode active material, a particle size (D50) thereof is not particularly limited, and the particle size is preferably 0.1 μm to 30 μm, and more preferably 1 μm to 10 μm. If the particle size (D50) of the negative electrode active material is less than the lower limit of the preferable range, when the nonaqueous electrolyte secondary battery is exposed to a high temperature, reactivity increases, and thus handing becomes difficult. In addition, when the particle size exceeds the upper limit thereof, a discharging rate may decrease.

In addition, in this embodiment it is preferable that the negative electrode active material in the negative electrode 20 contain lithium (Li) and SiO$_X$ (0≤X<2), and a molar ratio (Li/SiO$_X$) thereof be in a range of 3.9 to 4.9. As described above, when the negative electrode active material is configured by lithium (Li) and SiO$_X$, and a molar ratio thereof is set to the above-described range, it is possible to obtain an effect capable of preventing charging abnormality and the like. In addition, even when the nonaqueous electrolyte secondary battery 1 is used or stored for a long period of time under a high-temperature environment, it is possible to obtain an effect of improving storage characteristics without a decrease in discharging capacity.

When the molar ratio (Li/SiO$_X$) is less than 3.9, Li is deficient, and thus Li deficiency occurs after use or storage for a long period of time under a high-temperature environment, and thus discharging capacity decreases.

On the other hand, when the molar ratio (Li/SiO$_X$) exceeds 4.9, Li is excessive, and thus charging abnormality may occur. In addition, metal Li remains without being trapped in $SiO_x$, and thus resistance increases and discharging capacity may decrease.

In addition, in this embodiment, it is more preferable that the molar ratio ($Li/SiO_x$) in the above-described range be set by selecting a more appropriate range in accordance with a kind of the positive electrode active material contained in the above-described positive electrode 10. For example, in a case of using lithium titanate as the positive electrode active material, it is more preferable that the molar ratio ($Li/SiO_x$) in the negative electrode active material be set to a range of 4.0 to 4.7. In addition, in a case of using lithium manganese oxide as the positive electrode active material, as described above, the molar ratio ($Li/SiO_x$) in the negative electrode active material is set to a range of 3.9 to 4.9. As described above, when the molar ratio ($Li/SiO_x$) of the negative electrode active material is set to a range in accordance with the kind of the positive electrode active material, it is possible to obtain an effect of suppressing an increase in initial resistance and of preventing charging abnormality and the like, or it is possible to more significantly obtain an effect of improving storage characteristics without a decrease in discharging capacity even after use or storage for a long period of time under a high-temperature environment.

An amount of the negative electrode active material in the negative electrode 20 is determined in consideration of discharging capacity and the like that are demanded for the nonaqueous electrolyte secondary battery 1, and the amount is preferably equal to or more than 50 mass %, and more preferably 60 mass % to 80 mass %.

In the negative electrode 20, when the amount of the negative electrode active material configured by the above-described material is equal to or more than the lower limit of the preferable range, it is easy to obtain sufficient discharging capacity. In addition, the amount of the negative electrode active material is equal to or less than the upper limit thereof, it is easy to mold the negative electrode 20.

The negative electrode 20 may contain a conductive assistant (hereinafter, the conductive assistant that is used in the negative electrode 20 may be referred to as a "negative electrode conductive assistant"). The negative electrode conductive assistant is the same as the positive electrode conductive assistant.

The negative electrode 20 may contain a binder (hereinafter, the binder that is used in the negative electrode 20 may be referred to as a "negative electrode binder").

Examples of the negative electrode binder include polyvinylidene fluoride (PVDF), styrene-butadiene rubber (SBR), polyacrylic acid (PA), carboxymethyl cellulose (CMC), polyimide (PI), polyamide imide (PAI), and the like. Among these, the polyacrylic acid is preferable, and a cross-linking type polyacrylic acid is more preferable.

In addition, as the negative electrode binder, the above-described materials may be used alone or in combination of two or more kinds thereof. In addition, in a case of using the polyacrylic acid as the negative electrode binder, it is preferable that the polyacrylic acid be adjusted in advance to pH 3 to pH 10. For the pH adjustment in this case, for example, an alkali metal hydroxide such as lithium hydroxide, or an alkali-earth metal hydroxide such as magnesium hydroxide may be used.

An amount of the negative electrode binder in the negative electrode 20 may be set, for example, to 1 mass % to 20 mass %.

In addition, the size and the thickness of the negative electrode 20 are the same as the size and the thickness of the positive electrode 10.

In addition, the nonaqueous electrolyte secondary battery 1 illustrated in FIG. 1 employs a configuration in which the lithium foil 60 is provided on a surface of the negative electrode 20, that is, between the negative electrode 20 and the separator 30 to be described later.

As a method of manufacturing the negative electrode 20, it is possible to employ a method in which the above-described material is used as the negative electrode active material, and the negative electrode conductive assistant and/or the negative electrode binder are mixed as necessary to prepare a negative electrode mixture, and the negative electrode mixture is compression-molded into an arbitrary shape.

A pressure during the compression molding is determined in consideration of a kind of the negative electrode conductive assistant and the like, and for example, may be set to 0.2 ton/cm² to 5 ton/cm².

In addition, the negative electrode current collector 24 may be configured by using the same material as that of the positive electrode current collector 14.

Separator

The separator 30 is interposed between the positive electrode 10 and the negative electrode 20, and as the separator 30, an insulating film, which has large ion permeability, is excellent in heat resistance, and has a predetermined mechanical strength, is used.

As the separator 30, a separator formed from a material, which is used in a separator of a nonaqueous electrode secondary battery in the related art and satisfies the above-described characteristics, may be applied without any limitation. Examples of the material include glass such as alkali glass, borosilicate glass, quartz glass, and lead glass, non-woven fabric or fiber configured by a resin such as polyphenylene sulfide (PPS), polyether ether ketone (PEEK), polyethylene terephthalate (PET), polyamide-imide (PAI), polyamide, polyimide (PI), aramid, cellulose, a fluorine resin, and ceramics, and the like. Among these, as the separator 30, it is more preferable to use the non-woven fabric configured by glass fiber. The glass fiber is excellent in mechanical strength and has large ion permeability, and thus the glass fiber reduces internal resistance. Accordingly, it is possible to improve discharging capacity.

The thickness of the separator 30 is determined in consideration of the size of the nonaqueous electrolyte secondary battery 1, a material of the separator 30, and the like, and for example, may be set to approximately 5 μm to 300 μm.

Capacity Balance Between Negative Electrode and Positive Electrode

In the nonaqueous electrolyte secondary battery 1 of this embodiment, it is preferable that capacity balance (negative electrode capacity (mAh)/positive electrode capacity (mAh)), which is expressed by capacity of the negative electrode 20 and capacity of the positive electrode 10, be in a range of 1.56 to 2.51.

When the capacity balance between the negative electrode 20 and the positive electrode 10 is set to the above-described range, a predetermined margin can be secured to the negative electrode side capacity. Accordingly, for example, even when decomposition of the negative electrode active material rapidly progresses due to a battery reaction, it is possible to secure the negative electrode capacity that is equal to or more than a constant value. Accordingly, even when the nonaqueous electrolyte secondary battery 1 is used and stored for a long period of time under a strict high-temperature and high-humidity environment, a decrease in discharging capacity is suppressed, and thus it is possible to obtain an effect of improving storage characteristics.

When the capacity balance between the negative electrode 20 and the positive electrode 10 is less than 1.56, deterioration increases during use for a long period of time under a high-temperature environment, and thus capacity retention becomes difficult. On the other hand, when the capacity balance between the negative electrode 20 and the positive electrode 10 exceeds 2.51, it is difficult to obtain sufficient discharging capacity.

In the nonaqueous electrolyte secondary battery 1 of this embodiment, after the caulking tip end 12b of the positive electrode casing 12 is disposed in an inward direction than the tip end 22a of the negative electrode casing 22, and the size of the nonaqueous electrolyte secondary battery 1, the radius of curvature R of the side surface portion 12d of the positive electrode casing 12, and the size relationship between the nonaqueous electrolyte secondary battery 1 and the positive electrode casing 12 are respectively defined as described above, the capacity balance between the negative electrode 20 and the positive electrode 10 is configured to the above-described range, and thus even in a case of use or storage for a long period of time under a high-temperature environment, it is possible to retain high discharging capacity and storage characteristics become excellent.

Use of Nonaqueous Electrolyte Secondary Battery

As described above, the nonaqueous electrolyte secondary battery 1 of this embodiment has high sealing properties, and even in a case of use or storage for a long period of time under a high-temperature environment, high discharging capacity can be retained, sufficient discharging capacity can be obtained in a broad temperature range, and storage characteristics are excellent. Accordingly, the nonaqueous electrolyte secondary battery 1 is appropriately used as a back-up power supply with a voltage value of, for example, 2 V to 3 V.

Operational Effect

As described above, according to the nonaqueous electrolyte secondary battery 1 that is an embodiment of the invention, as described above, when the caulking tip end 12b in the opening 12a of the positive electrode casing 12 is disposed in an inward direction the tip end 22a of the negative electrode casing 22, and the size of the nonaqueous electrolyte secondary battery 1, the radius of curvature R of the side surface portion 12d of the positive electrode casing 12, and the size relationship between the nonaqueous electrolyte secondary battery 1 and the positive electrode casing 12 are respectively set in the above-described ranges, it is possible to reliably press the negative electrode casing 22 by the positive electrode casing 12, and it is possible to compress the gasket 40 at a sufficient compression ratio, and thus sealing conditions are defined in an appropriate range.

According to this, even when the nonaqueous electrolyte secondary battery 1 having a size in which the diameter d is in 6.6 mm to 7.0 mm, and the height h1 is 1.9 mm to 2.3 mm is used or stored under a high-temperature environment, occurrence of a gap between the positive electrode casing 12 or the negative electrode casing 22 and the gasket 40 is suppressed and thus sealing properties of the battery can be improved, and thus volatilization of the electrolytic solution or intrusion of moisture in the air into the inside of the battery can be effectively prevented.

Accordingly, it is possible to provide the nonaqueous electrolyte secondary battery 1 in which even under a high-temperature environment, battery characteristics do not deteriorate, sufficient discharging capacity can be retained, discharging capacity is large, and excellent storage characteristics are provided.

EXAMPLES

Next, the invention will be described in more detail with reference to Examples and Comparative Examples. However, a range of the invention is not limited by Examples. The nonaqueous electrolyte secondary battery related to the invention may be embedded by making appropriate modifications in a range not departing from the gist of the invention.

Examples 1 to 4

In Example 1, as the nonaqueous electrolyte secondary battery, the coin-type nonaqueous electrolyte secondary battery illustrated in FIG. 1 was prepared. In addition, in these examples, lithium titanate ($Li_4Ti_5O_{12}$) was used as the positive electrode active material, and SiO was used as the negative electrode active material. A nonaqueous electrolyte secondary battery (lithium secondary battery) of a coin-type (621 size) having an outer diameter (diameter d) of 6.8 mm and a thickness (height h1) of 2.1 mm in a cross-sectional view illustrated in FIG. 1 was prepared, and sealing properties under a high-temperature and high-humidity environment were evaluated.

Preparation of Battery

With regard to the positive electrode 10, first, graphite as a conductive assistant and polyacrylic acid as a binding agent were mixed to commercially available lithium titanate ($Li_4Ti_5O_{12}$) in a ratio of lithium titanate:graphite:polyacrylic acid=90:8:2 (a mass ratio) to prepare a positive electrode mixture.

Subsequently, 18 mg of the positive electrode mixture that was obtained was compression-molded with a compression pressure of 2 ton/cm$^2$ to obtain a disk-shaped pellet having a diameter of 3.7 mm.

Next, the pellet (positive electrode 10) that was obtained was bonded to an inner surface of the positive electrode casing 12 formed from stainless steel (NAS64: average plate thickness t=0.20 mm) using a conductive resin adhesive containing carbon to integrate the pellet and the positive electrode casing 12, thereby obtaining a positive electrode unit. Then, the positive electrode unit was decompressed, heated, and dried at 120° C. for 11 hours in the air.

In addition, a sealing agent was applied to an inner side surface of the opening 12a of the positive electrode casing 12 in the positive electrode unit.

Next, with regard to the negative electrode 20, first, a material obtained by pulverizing commercially available SiO was prepared as the negative electrode active material, and graphite as a conductive agent and polyacrylic acid as a binding agent were mixed to the negative electrode active material in a ratio of 54:44:2 (mass ratio) to prepare a negative electrode mixture.

Subsequently, 6.4 mg of the negative electrode mixture that was obtained was compression-molded with a compression pressure of 2 ton/cm$^2$ to obtain a disk-shaped pellet having a diameter of 3.8 mm.

Next, the pellet (negative electrode 20) that was obtained was bonded to an inner surface of the negative electrode casing 22 formed from stainless steel (SUS304-BA: t=0.20 mm) using a conductive resin adhesive containing carbon as a conductive filler to integrate the pellet and the negative electrode casing 22, thereby obtaining a negative electrode unit. Then, the negative electrode unit was decompressed, heated, and dried at 160° C. for 11 hours in the air.

Furthermore, lithium foil 60 punched with a diameter of 3.6 mm and a thickness of 0.42 mm was compressed onto the negative electrode 20 having a pellet shape to prepare a lithium-negative electrode stacked electrode.

As described above, in these examples, nonaqueous electrolyte secondary batteries were prepared with a configuration in which the positive electrode current collector 14 and the negative electrode current collector 24, which are illustrated in FIG. 1, were not provided, the positive electrode casing 12 was allowed to have a function of the positive electrode current collector, and the negative electrode casing 22 was allowed to have a function of the negative electrode current collector.

Next, non-woven fabric configured by glass fiber was dried, and was punched into a disk shape having a diameter of 4.9 mm, thereby preparing the separator 30. Then, the separator 30 was placed on the lithium foil 60 that was compressed onto the negative electrode 20, and the gasket 40 formed from polypropylene was disposed at the opening of the negative electrode casing 22.

Next, an organic solvent was adjusted in accordance with the following mixing ratio (volume %), and a supporting salt was dissolved in the organic solvent to adjust the electrolytic solution. At this time, as the organic solvent, a mixed solvent was adjusted by mixing propylene carbonate (PC), ethylene carbonate (EC), and dimethoxy ethane (DME) in a ratio of (PC:EC:DME)=(1:1:2) in terms of a volume ratio. Next, as the supporting salt, $Li(CF_3SO_2)_2N$ was dissolved in the mixed solvent, which was obtained, in a concentration of 1 mol/L, thereby obtaining the electrolytic solution 50.

In addition, the electrolytic solution 50, which was adjusted in the above-described procedure, filled the positive electrode casing 12 and the negative electrode casing 22 in a total amount of 15 μL per one battery.

Next, the negative electrode unit was caulked to the positive electrode unit in order for the separator 30 to come into contact with the positive electrode 10. At this time, caulking was performed in such a manner that the caulking tip end 12b in the opening 12a of the positive electrode casing 12 was disposed in an inward direction of the negative electrode casing 22 than the tip end 22a of the negative electrode casing 22, and the side surface portion 12d of the positive electrode casing 12 had a curved surface shape on an opening 12a side. At this time, processing was performed in such a manner that the radius of curvature R (mm) of the side surface portion 12d became a dimension shown in Table 1. In addition, the processing was performed in such a manner that the height h2 of the positive electrode casing 12 with respect to the height h1 of the nonaqueous electrolyte secondary battery 1 became a ratio (h2/h1) shown in the following Table 1. In addition, as shown in the following Table 1, the radius of curvature R (mm) of the side surface portion 12d of the positive electrode casing 12 was set to 1.0 mm in Examples 1 to 4.

In addition, the opening of the positive electrode casing 12 was caulked to seal the positive electrode casing 12 and the negative electrode casing 22, and then the resultant object was left as is at 25° C. for seven days to prepare nonaqueous electrode secondary batteries of Examples 1 to 4.

High-Temperature and High-Humidity Storage Test: Evaluation of Sealing Properties With respect to the nonaqueous electrolyte secondary batteries of Examples 1 to 4 which were obtained in the above-described procedure, the following high-temperature and high-humidity storage test (HHTS) was performed to evaluate sealing properties (storage characteristics) under a high-temperature and high-humidity environment.

Specifically, first, each of the nonaqueous electrolyte secondary batteries, which were obtained, was discharged with a constant current of 5 μA (discharging current) under an environment of 25° C. until a voltage reached 1.5 V. Subsequently, a voltage of 2.3 V was applied for 48 hours under an environment of 25° C. Then, capacity when the nonaqueous electrolyte secondary battery was discharged with a constant current of 5 μA (discharging current) under an environment of 25° C. until a voltage reached 1.5 V was measured. The measured value is shown as initial capacity (mAh) in the following Table 1. In addition, with regard to internal resistance (Ω) of the nonaqueous electrolyte secondary battery that was obtained, an LCR meter was used, and impedance at AC 1 kHz was measured to measure the internal resistance between the positive electrode and the negative electrode. The measured value is shown in the following Table 1 as initial resistance (Ω).

Next, the nonaqueous electrolyte secondary battery was left as is for 30 days while being exposed to a high-temperature and high-humidity environment of 80° C. and 90% RH by using a high-humidity and constant-temperature tester (HHTS).

In addition, with respect to the nonaqueous electrolyte secondary battery exposed to the high-temperature and high-humidity environment of the above-described conditions, capacity when the nonaqueous electrolyte secondary battery was discharged with a constant current of 5 μA (discharging current) under an environment of 25° C. until a voltage reached 1.0 V was measured. The measured value is shown as capacity (mAh) after a test (after storage for 30 days) in the following Table 1. In addition, the internal resistance between the positive electrode and the negative electrode of the nonaqueous electrolyte secondary battery that was exposed to the high-temperature and high-humidity environment of the above-described conditions was measured by the above-described method. The measured value is shown as resistance (Ω) after a test (after storage for 30 days) in the following Table 1.

In the high-temperature and high-humidity storage test in these examples, particularly, a variation (reduced state) in capacity after the test with respect to the initial capacity was set as an index of the storage characteristics, that is, the sealing properties of the battery under a high-temperature environment.

TABLE 1

| | Dimensions of positive electrode casing (mm) | | | Internal resistance (Ω) | | Discharging capacity (mAh) | | Capacity retention ratio |
|---|---|---|---|---|---|---|---|---|
| | R of side surface portion | Height h2 | h2/h1 (%) | Initial | After storage for 30 days | Initial | After storage for 30 days | |
| Example 1 | 1.0 | 1.44 | 68.6 | 43.8 | 86.3 | 2.63 | 2.32 | 88.0% |
| Example 2 | 1.0 | 1.47 | 70.0 | 41.8 | 81.1 | 2.60 | 2.45 | 94.3% |

TABLE 1-continued

| | Dimensions of positive electrode casing (mm) | | | Internal resistance (Ω) | | Discharging capacity (mAh) | | |
|---|---|---|---|---|---|---|---|---|
| | R of side surface portion | Height h2 | h2/h1 (%) | Initial | After storage for 30 days | Initial | After storage for 30 days | Capacity retention ratio |
| Example 3 | 1.0 | 1.51 | 71.9 | 45.9 | 90.0 | 2.60 | 2.53 | 97.2% |
| Example 4 | 1.0 | 1.52 | 72.4 | 46.9 | 95.0 | 2.57 | 2.31 | 90.0% |
| Comparative Example 1 | 1.0 | 1.54 | 73.3 | 42.9 | 105.1 | 2.61 | 2.25 | 86.0% |

Comparative Example 1

In Comparative Example 1, a nonaqueous electrolyte secondary battery was prepared in accordance with the same conditions and the same procedure as in Example 1 except that with respect to the preparation conditions of the battery in Example 1, the caulking was performed in order for the height h2 of the positive electrode casing 12 with respect to the height h1 of the nonaqueous electrolyte secondary battery 1 to be a ratio (h2/h1) shown in the following Table 1, and then the sealing properties were evaluated under that same conditions as described above. The result is shown in Table 1.

Examples 5 to 7

Preparation of Battery

In Examples 5 to 7, coin-type nonaqueous electrolyte secondary batteries illustrated in FIG. 1 were prepared in accordance with the same conditions and the same procedure as in Example 4 except that with respect to the preparation conditions of the battery in Example 1, the radius of curvature R (mm) of the side surface portion 12d of the positive electrode casing 12 was changed to a dimension shown in the following Table 2.

Evaluation of Internal Resistance

With respect to the nonaqueous electrolyte secondary batteries of Examples 5 and 6 which were obtained in the above-described procedure, the following high-temperature storage test was performed to evaluate a variation in the internal resistance under a high-temperature environment.

Specifically, first, the internal resistance (Ω) between the positive electrode and the negative electrode of the nonaqueous electrolyte secondary batteries which were obtained was measured by the same method as described above. The measured internal resistance is shown as initial resistance (Ω) in Table 2.

Next, the nonaqueous electrolyte secondary battery was left as is for 30 days while being exposed to a high-temperature and high-humidity environment of 80° C. and 90% RH by using a high-humidity and constant-temperature tester (HHTS).

In addition, with respect to the nonaqueous electrolyte secondary battery exposed to the high-temperature and high-humidity environment of the above-described conditions, the internal resistance between the positive electrode and the negative electrode was measured by the above-described method. The measured value is shown as resistance (Ω) after a test (after storage for 30 days) in the following Table 2.

In the high-humidity and constant-temperature test performed in this example, a variation (resistance increased state) of the resistance after the test with respect to the initial resistance was set as an index of the battery characteristics under a high-temperature environment.

TABLE 2

| | R of side surface portion of positive electrode casing | Internal resistance (Ω) | | Resistance increase rate |
|---|---|---|---|---|
| | | Initial | After storage for 30 days | |
| Example 5 | 0.8 | 35.0 | 72.8 | 208% |
| Example 6 | 1 | 36.0 | 90.4 | 251% |
| Example 7 | 1.1 | 35.1 | 91.2 | 260% |
| Comparative Example 2 | 1.2 | 37.8 | 107.5 | 285% |

Comparative Example 2

In Comparative Example 2, a coin-type nonaqueous electrolyte secondary battery illustrated in FIG. 1 were prepared in accordance with the same conditions and the same procedure as in Examples 5 to 7 except that with respect to the preparation conditions of the battery in Examples 5 to 7, the radius of curvature R (mm) of the side surface portion 12d of the positive electrode casing 12 was changed to a dimension shown in Table 2.

In addition, with respect to the nonaqueous electrolyte secondary batteries which were obtained, a high-temperature storage test was performed under the same conditions as in Examples 5 to 7 to evaluate a variation in the internal resistance under a high-temperature environment.

Examples 8 to 11, and Test Example 1

In Examples 8 to 11, and Test Example 1, as the negative electrode active material used in the negative electrode 20, a negative electrode active material containing lithium (Li) and SiO was used, and a molar ratio (Li/SiO) thereof was set to a ratio shown in the following Table 3.

In addition, in Examples 8 to 11, and Test Example 1, the nonaqueous electrolyte secondary battery 1 was set to a coin type (621 size) having an outer diameter of 6.8 mm (diameter d) and a thickness of 2.1 mm (height h1) in the cross-sectional view illustrated in FIG. 1, and respective dimensions were adjusted in such a manner that a ratio between a radius of curvature R (mm) of a side surface portion 12d of the positive electrode casing 12, a height h2 of the positive electrode casing 12, and a height h1 of the nonaqueous electrolyte secondary battery 1 satisfies the range defined in the aspect of the invention.

In addition, in Examples 8 to 11, and Test Example 1, respective capacities were set in such a manner that the capacity balance (negative electrode capacity (mAh)/positive electrode capacity (mAh)) between the capacity of the negative electrode 20 and the capacity of the positive electrode 10 became 1.95, and coin-type nonaqueous electrolyte secondary batteries illustrated in FIG. 1 were prepared in a state in which other conditions and a procedure were made to be equal to those in Example 1.

In addition, with respect to the nonaqueous electrolyte secondary batteries of Examples 8 to 11 and Test Example 1 which were obtained in the above-described procedure, the following high-temperature and high-humidity storage test (HHTS) was performed to evaluate storage characteristics under a high-temperature and high-humidity environment.

Specifically, first, each of the nonaqueous electrolyte secondary batteries, which were obtained, was discharged by using resistance of 30 kΩ as current limitation resistance under an environment of 25° C. until a voltage reached 1.0 V. Subsequently, a voltage of 2.3 V was applied for 72 hours by using constant resistance of 330Ω under an environment of 25° C.

Then, capacity when the nonaqueous electrolyte secondary battery was discharged using resistance of 30 kΩ as the current limitation resistance under an environment of 25° C. until a voltage reached 1.0 V was measured. The measured value is shown as initial capacity (mAh) in the following Table 3.

Next, the above-described nonaqueous electrolyte secondary battery was left as it is for 30 days while being exposed to a high-temperature and high-humidity environment of 80° C. and 90% RH by using a high-humidity and constant-temperature tester (HHTS).

In addition, with respect to the nonaqueous electrolyte secondary battery exposed to the high-temperature and high-humidity environment of the above-described conditions, capacity when the nonaqueous electrolyte secondary battery was discharged by using resistance of 30 kΩ as the current limitation resistance under an environment of 25° C. until a voltage reached 1.0 V was measured. The measured value is shown as capacity (mAh) after a test (after storage for 30 days) in the following Table 3.

In the high-temperature and high-humidity storage test in these examples, particularly, a variation (reduced state) in capacity after the test with respect to the initial capacity was set as an index of the storage characteristics of the battery under a high-temperature environment.

TABLE 3

|  | Molar ratio (Li/SiO) | Discharging capacity (mAh) | | Capacity retention ratio |
|---|---|---|---|---|
|  |  | Initial | After storage for 30 days (80° C., 90%) |  |
| Test Example 1 | 3.81 | 2.46 | 1.62 | 65.6% |
| Example 8 | 4.04 | 2.52 | 1.94 | 76.8% |
| Example 9 | 4.27 | 2.50 | 1.97 | 78.7% |
| Example 10 | 4.44 | 2.54 | 1.98 | 78.1% |
| Example 11 | 4.63 | 2.50 | 2.36 | 94.4% |

Examples 12 to 15, and Test Example 2

In Examples 12 to 15, and Test Example 2, as the negative electrode active material used in the negative electrode 20, a negative electrode active material containing lithium (Li) and SiO was used, and a molar ratio (Li/SiO) thereof was set to a ratio shown in the following Table 4. In addition, in Examples 11 to 14, and Test Example 2, with regard to the positive electrode active material used in the positive electrode, lithium manganese oxide ($Li_4Mn_5O_{12}$) was used instead of lithium titanate ($Li_4Ti_5O_{12}$).

In addition, in Examples 12 to 15, and Test Example 2, respective capacities were set in such a manner that the capacity balance (negative electrode capacity (mAh)/positive electrode capacity (mAh)) between the capacity of the negative electrode 20 and the capacity of the positive electrode 10 became 2.03, and coin-type nonaqueous electrolyte secondary batteries illustrated in FIG. 1 were prepared in a state in which other conditions and a procedure were made to be equal to those in Example 7 and the like.

In addition, with respect to the nonaqueous electrolyte secondary batteries of Examples 12 to 15, and Test Example 2 which were obtained in the above-described procedure, the following high-temperature storage test was performed to evaluate capacity retention ratio under a high-temperature environment.

Specifically, first, each of the nonaqueous electrolyte secondary batteries, which were obtained, was constant-current-discharged by using resistance of 47 kΩ as current limitation resistance under an environment of 25° C. until a voltage reached 2.0 V. Subsequently, a voltage of 3.1 V was applied for 72 hours by using constant resistance of 330Ω under an environment of 25° C.

Then, capacity when the nonaqueous electrolyte secondary battery was discharged using resistance of 47 kΩ as the current limitation resistance under an environment of 25° C. until a voltage reached 2.0 V was measured. The measured value is shown as initial capacity (mAh) in the following Table 4.

Next, the above-described nonaqueous electrolyte secondary battery was left as it is for 80 days while being exposed to a high-temperature environment of 85° C. by using a high-temperature tester.

In addition, with respect to the nonaqueous electrolyte secondary battery exposed to the high-temperature environment of the above-described conditions, capacity when the nonaqueous electrolyte secondary battery was constant-current-discharged by using resistance of 47 kΩ as the current limitation resistance under an environment of 25° C. until a voltage reached 2.0 V was measured. The measured value is shown as capacity (mAh) after a test (after 80 days) in the following Table 4, and a capacity retention ratio is also shown in the following Table 4.

In the high-temperature storage test in these examples, a variation (reduced state) in capacity after the test with respect to the initial capacity was set as an index of the capacity retention ratio under a high-temperature environment.

TABLE 4

|  | Molar ratio (Li/SiO) | Discharging capacity (mAh) | | Capacity retention ratio |
|---|---|---|---|---|
|  |  | Initial | After storage at 85° C. for 80 days |  |
| Test Example 2 | 3.52 | 3.39 | 2.55 | 75.3% |
| Example 12 | 3.96 | 3.48 | 2.67 | 76.9% |
| Example 13 | 4.19 | 3.47 | 2.66 | 76.8% |
| Example 14 | 4.36 | 3.43 | 2.67 | 78.0% |
| Example 15 | 4.79 | 3.30 | 2.62 | 81.8% |

Evaluation Result

Figure 3:
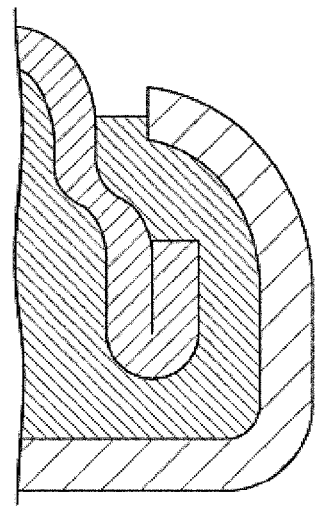
FIG. 3 is a schematic cross-sectional view illustrating an example of the nonaqueous electrolyte secondary battery according to the embodiment of the invention.

As shown in Table 1, in the nonaqueous electrolyte secondary batteries of Examples 1 to 4 in which the caulking tip end 12b in the opening 12a of the positive electrode casing 12 was disposed in an inward direction than the tip end 22a of the negative electrode casing 22, and the size of the nonaqueous electrolyte secondary battery 1, the radius of curvature R of the side surface portion 12d of the positive electrode casing 12, and the size relationship between the nonaqueous electrolyte secondary battery 1 and the positive electrode casing 12 were defined in the ranges defined in the invention (the aspect), the capacity retention ratio after the high-temperature and high-humidity test for 30 days was 88.0% to 97.2% and was higher in comparison to Comparative Example 1 (86.0%), and thus it could be seen that the capacity retention ratio under a high-temperature and high-humidity environment was excellent. In addition, in the nonaqueous electrolyte secondary batteries of Examples 1 to 4, the internal resistance ($\Omega$) after the high-temperature and high-humidity test was 81.1$\Omega$ to 95.0$\Omega$, and was smaller in comparison to Comparative Example 1 (105.1$\Omega$), and thus it could be seen that the battery characteristics were excellent. In addition, as illustrated in a schematic cross-sectional view of FIG. 3, in the nonaqueous electrolyte secondary battery of Example 1, satisfactory sealing properties were retained without occurrence of a gap and the like at the inside of the battery even after the high-temperature and high-humidity test.

From these results, it is apparent that in the nonaqueous electrolyte secondary batteries of Examples 1 to 4, an inner electrolyte did not volatilize to the outside, and moisture in the air did not intrude into the inside of the battery, and thus satisfactory sealing properties and battery characteristics.

Figure 5:
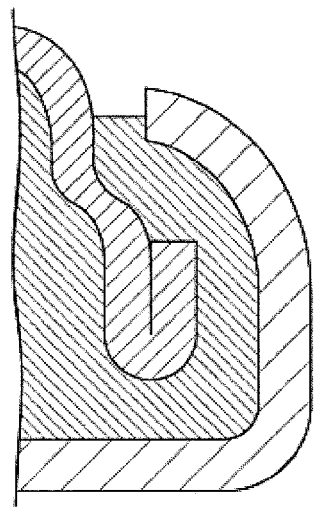
FIG. 5 is a schematic cross-sectional view illustrating an internal state of the battery after a radius of curvature R of a side surface portion of a positive electrode casing provided to the nonaqueous electrolyte secondary battery is appropriately changed, and a high-temperature and high-humidity test is performed.
Figure 6:
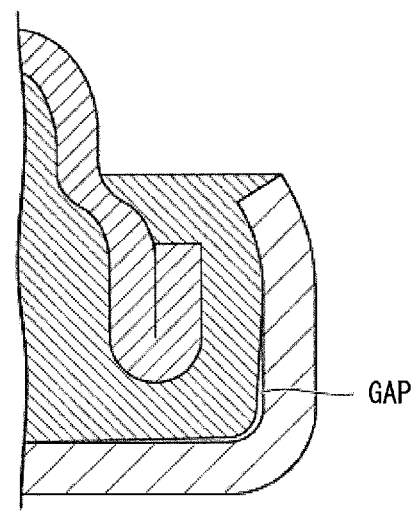
FIG. 6 is a schematic cross-sectional view illustrating a nonaqueous electrolyte secondary battery of the related art.

In addition, as shown in Table 2, in the nonaqueous electrolyte secondary batteries of Examples 5 to 7 in which the caulking tip end 12b in the opening 12a of the positive electrode casing 12 was disposed in an inward direction than the tip end 22a of the negative electrode casing 22, the size of the nonaqueous electrolyte secondary battery 1, and the size relationship between the nonaqueous electrolyte secondary battery 1 and the positive electrode casing 12 were set similar to those in Example 1, and the radius of curvature R of the side surface portion 12d of the positive electrode casing 12 was changed in the range defined in the invention (the aspect), the internal resistance ($\Omega$) after the high-temperature and high-humidity test was 72.8$\Omega$ to 91.2$\Omega$ and was smaller in comparison to Comparative Example 2 (107.5$\Omega$). Accordingly, it is apparent that satisfactory sealing properties and battery characteristics are provided. In addition, as illustrated in a schematic cross-sectional view of FIG. 5, in the nonaqueous electrolyte secondary battery of Example 5 in which the radius of curvature R of the side surface portion 12d of the positive electrode casing 12 was set to 0.8 mm, relatively satisfactory sealing properties were retained without occurrence of a large gap and the like at the inside of the battery even after the high-temperature and high-humidity test. In addition, in the nonaqueous electrolyte secondary battery of Example 6 in which the radius of curvature R of the side surface portion 12d of the positive electrode casing 12 was set to 1.0 mm, and the nonaqueous electrolyte secondary battery of Example 7 in which the radius of curvature R of the side surface portion 12d of the positive electrode casing 12 was set to 1.1 mm, as is the case with Example 5 illustrated in a schematic cross-sectional view of FIG. 5, very satisfactory sealing properties were retained without occurrence of a gap and the like at the inside of the battery even after the high-temperature and high-humidity test.

Figure 4:
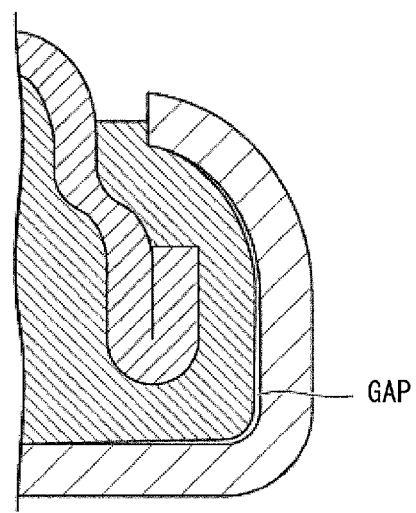
FIG. 4 is a schematic cross-sectional view illustrating a comparative example that is a nonaqueous electrolyte secondary battery having a configuration of the related art.

On the other hand, in Comparative Example 1 as shown in Table 1, the capacity retention ratio after the high-temperature and high-humidity test for 30 days was 86.0% and was lower in comparison to Examples 1 to 4. In addition, In addition, as illustrated in a schematic cross-sectional view of FIG. 4, in the nonaqueous electrolyte secondary battery of Comparative Example 1, a gap occurred between the positive electrode casing and the gasket after the high-temperature and high-humidity test, and thus it can be seen that the sealing properties deteriorate.

From these results, in Comparative Example 1, among the conditions defined in the invention (the aspect), the ratio (h2/h1) of the height h2 of the positive electrode casing 12 to the height h1 of the nonaqueous electrolyte secondary battery 1 deviated from the defined range. Accordingly, it is apparent that a gap and the like occurred between the positive electrode casing and the gasket (or between the negative electrode casing and the gasket), and the electrolyte solution volatilized to the outside or moisture in the air intruded into the inside of the battery, and thus discharging capacity decreased.

In addition, in Comparative Example 2 as shown in Table 2, the internal resistance ($\Omega$) after the high-temperature and the high-humidity test was 107.5$\Omega$, and was larger in comparison to Examples 5 to 7. In the nonaqueous electrolyte secondary battery of Comparative Example 2, as illustrated in a schematic cross-sectional view of FIG. 5, as is the case with Example 1, Example 5, and the like, a gap and the like did not occur after the high-temperature and high-humidity test, particularly, at the inside of the battery. However, in Comparative Example 2, the radius of curvature R (mm) of the side surface portion of the positive electrode casing exceeded the range defined in the invention (the aspect), and thus it is considered that the height h2 of the positive electrode casing tends to vary, and this tendency has led to an increase in the internal resistance.

In addition, as shown in Table 3 and Table 4, in Examples 8 to 15 in which the sealing conditions between the positive electrode casing 12 and the negative electrode casing 22 were set in the range defined in the invention (the aspect), an active material containing lithium (Li) and SiO was used as the negative electrode active material used in the negative electrode 20, and a molar ratio (Li/SiO) thereof was limited to an appropriate range (3.9 to 4.9), the capacity retention ratio after the high-temperature and high-humidity storage test is 76.8% to 94.4%, the capacity retention ratio after the high-temperature storage test is 76.8% to 81.8%, and these capacity retention ratios are higher in comparison to Test Example 1 or Test Example 2 in which an amount of Li was smaller, and thus it can be seen that the capacity retention ratio in an high-temperature and high-humidity environment and in a high-temperature environment is excellent.

Here, as shown in Table 3, for example, in a case of using lithium titanate as the positive electrode active material in the positive electrode 10, when the molar ratio (Li/SiO$_X$) between Li and SiO$_X$ in the negative electrode active material is set to a range of 4.0 to 4.7, it can be seen that an excellent capacity retention ratio can be obtained even under a high-temperature and high-humidity environment.

In addition, as shown in Table 4, in a case of using lithium manganese oxide as the positive electrode active material in the positive electrode 10, when the molar ratio (Li/SiO$_X$) between Li and SiO$_X$ in the negative electrode active material is in a range of 3.9 to 4.9 as described above, it can be seen that an excellent capacity retention ratio can be obtained even under a high-temperature environment.

From the results of Examples described above, when the nonaqueous electrolyte secondary battery, in which the diameter d is in a range of 6.6 mm to 7.0 mm and the height h1 is in a range of 1.9 mm to 2.3 mm, is configured under the conditions defined in the invention, it is possible to improve sealing properties of a battery, and it is possible to effectively prevent occurrence of volatilization of the electrolytic solution or intrusion of moisture in the air into the inside of the battery under a high-temperature environment, and thus it is apparent that the battery characteristics do not deteriorate, the discharging capacity is large, and excellent storage characteristics can be obtained.

According to the nonaqueous electrolyte secondary battery of the invention, when the above-described configurations are employed, even in a case of use or storage under a high-temperature environment, the battery characteristics do not deteriorate, the discharging capacity is large, and excellent storage characteristics can be obtained. Accordingly, when the invention is applied, for example, to a nonaqueous electrolyte secondary battery that is used in a field of various electronic apparatuses, it is also possible to contribute to an improvement in performance of various apparatuses.

What is claimed is:

1. A nonaqueous electrolyte secondary battery, comprising:
    a bottomed cylindrical positive electrode casing; and
    a negative electrode casing fixed to an opening of the positive electrode casing through a gasket, such that an accommodation space is defined between the positive electrode casing and the negative electrode casing,
    wherein the opening of the positive electrode casing is sealed to the negative electrode casing side by a caulking material of the gasket to seal the accommodation space,
    where the caulking material has a uniform compression ratio of at least 50%, and
    where a caulking tip end of the positive electrode casing in the opening is inward of a tip end of the negative electrode casing, and
    a diameter d of the nonaqueous electrolyte secondary battery is in a range of 6.6 mm to 7.0 mm, a height h1 of the nonaqueous electrolyte secondary battery is in a range of 1.9 mm to 2.3 mm, at least a part of a side surface portion of the positive electrode casing on an opening side has a curved surface, a radius of curvature R of the curved surface is in a range of 0.8 mm to 1.1 mm, and a height h2 of the positive electrode casing is in a range of 65% to 73% with respect to the height h1 of the nonaqueous electrolyte secondary battery.

2. The nonaqueous electrolyte secondary battery according to claim 1, wherein the gasket comprises one of a polypropylene resin, polyphenylene sulfide (PPS), or a polyether ether ketone (PEEK) resin.

3. The nonaqueous electrolyte secondary battery according to claim 1, wherein a positive electrode on the positive electrode casing side includes a lithium compound as a positive electrode active material, a negative electrode on the negative electrode casing side includes $SiO_X$ ($0 \leq X < 2$) as a negative electrode active material, a separator between the positive electrode and the negative electrode, and an electrolytic solution that fills the accommodation space includes at least an organic solvent and a supporting salt in the accommodation space.

4. The nonaqueous electrolyte secondary battery according to claim 3, wherein the positive electrode active material includes a lithium manganese oxide or a lithium titanate.

5. The nonaqueous electrolyte secondary battery according to claim 3, wherein the negative electrode active material includes lithium (Li) and $SiO_X$ ($0 \leq X < 2$), and a molar ratio ($Li/SiO_X$) between lithium and $SiO_X$ is in a range of 3.9 to 4.9.

6. The nonaqueous electrolyte secondary battery according to claim 3, wherein in the electrolytic solution, the organic solvent is a mixed solvent that contains propylene carbonate (PC) that is a cyclic carbonate solvent, ethylene carbonate (EC) that is a cyclic carbonate solvent, and dimethoxy ethane (DME) that is a chain ether solvent.

7. The nonaqueous electrolyte secondary battery according to claim 6, wherein in the organic solvent, a mixing ratio between the propylene carbonate (PC), the ethylene carbonate (EC), and the dimethoxy ethane (DME) is (PC:EC:DME)=0.5 to 1.5:0.5 to 1.5:1 to 3 by a volume ratio.

8. The nonaqueous electrolyte secondary battery according to claim 3, wherein in the electrolytic solution, the supporting salt is lithium bis(trifluoromethane) sulfonimide ($Li(CF_3SO_2)_2N$).

9. The nonaqueous electrolyte secondary battery according to claim 3, wherein the separator comprises a glass fiber.

10. A nonaqueous electrolyte secondary battery, comprising:
    a bottomed cylindrical positive electrode casing; and
    a negative electrode casing fixed to an opening of the positive electrode casing through a gasket, such that an accommodation space is defined between the positive electrode casing and the negative electrode casing,
    wherein the opening of the positive electrode casing is sealed to the negative electrode casing side by a caulking material of the gasket to seal the accommodation space,
    a caulking tip end of the positive electrode casing in the opening is inward of a tip end of the negative electrode casing, and
    a diameter d of the nonaqueous electrolyte secondary battery is in a range of 6.6 mm to 7.0 mm, a height h1 of the nonaqueous electrolyte secondary battery is in a range of 1.9 mm to 2.3 mm, at least a part of a side surface portion of the positive electrode casing on an opening side has a curved surface, a radius of curvature R of the curved surface is in a range of 0.8 mm to 1.1 mm, and a height h2 of the positive electrode casing is in a range of 65% to 73% with respect to the height h1 of the nonaqueous electrolyte secondary battery,
    wherein a capacity balance (negative electrode capacity (mAh)/positive electrode capacity (mAh)), defined as a capacity of the negative electrode and capacity of the positive electrode, is in a range of 1.43 to 2.51.

* * * * *